United States Patent
Becerra et al.

(10) Patent No.: US 8,896,248 B2
(45) Date of Patent: Nov. 25, 2014

(54) METHODS AND SYSTEMS FOR CONTROLLING A MOTOR

(75) Inventors: Roger Carlos Becerra, Fort Wayne, IN (US); Ludovic Andre Chretien, Columbia City, IN (US); Mark A. Brattoli, Fort Wayne, IN (US); Glen C. Young, Fort Wayne, IN (US)

(73) Assignee: Regal Beloit America, Inc., Beloit, WI (US)

( * ) Notice: Subject to any disclaimer, the term of this patent is extended or adjusted under 35 U.S.C. 154(b) by 689 days.

(21) Appl. No.: 13/191,880

(22) Filed: Jul. 27, 2011

(65) Prior Publication Data
US 2013/0026962 A1     Jan. 31, 2013

(51) Int. Cl.
*H02P 6/18*     (2006.01)

(52) U.S. Cl.
USPC ............ 318/400.34; 318/400.01; 318/400.13; 318/490; 318/432

(58) Field of Classification Search
USPC ................... 318/490, 432, 362, 434, 400.01, 318/400.13, 400.34; 310/156.12
See application file for complete search history.

(56) References Cited

U.S. PATENT DOCUMENTS

| | | | | |
|---|---|---|---|---|
| 4,757,241 A * | 7/1988 | Young | ...................... | 318/400.13 |
| 5,423,192 A * | 6/1995 | Young et al. | ................. | 62/228.4 |
| 6,046,554 A * | 4/2000 | Becerra | ................... | 318/400.34 |
| 6,456,023 B1 | 9/2002 | Becerra et al. | | |
| 7,141,949 B2 * | 11/2006 | Harwood | ................ | 318/400.35 |
| 7,161,316 B2 | 1/2007 | Archer et al. | | |
| 7,436,138 B2 * | 10/2008 | Beifus | ........................... | 318/432 |
| 7,759,884 B2 * | 7/2010 | Dufner et al. | ............ | 318/400.01 |
| 2006/0197482 A1 * | 9/2006 | Harwood | ...................... | 318/439 |
| 2006/0267531 A1 * | 11/2006 | Hahn | ............................ | 318/439 |
| 2007/0024225 A1 * | 2/2007 | Hahn et al. | ..................... | 318/434 |
| 2007/0189739 A1 * | 8/2007 | Dufner et al. | ................ | 388/801 |
| 2007/0205731 A1 * | 9/2007 | Beifus | ........................... | 318/362 |
| 2007/0205732 A1 * | 9/2007 | Beifus | ........................... | 318/432 |
| 2007/0282461 A1 * | 12/2007 | Harwood | ........................ | 700/14 |
| 2010/0052590 A1 * | 3/2010 | Brattoli et al. | ............... | 318/490 |
| 2010/0275628 A1 * | 11/2010 | Moseley | ...................... | 62/228.1 |
| 2011/0291514 A1 * | 12/2011 | Figgins et al. | ........... | 310/156.12 |

* cited by examiner

*Primary Examiner* — Paul Ip
(74) *Attorney, Agent, or Firm* — Armstrong Teasdale LLP

(57) ABSTRACT

A control system for a motor includes an inverter coupled to the motor. The control system further includes a microcontroller coupled to the inverter. The microcontroller includes a processor programmed to measure an input voltage and acquire a back EMF voltage of the motor. The processor is also programmed to control the inverter to regulate the motor voltage based on the input voltage and the back EMF voltage to facilitate controlling the motor.

20 Claims, 7 Drawing Sheets

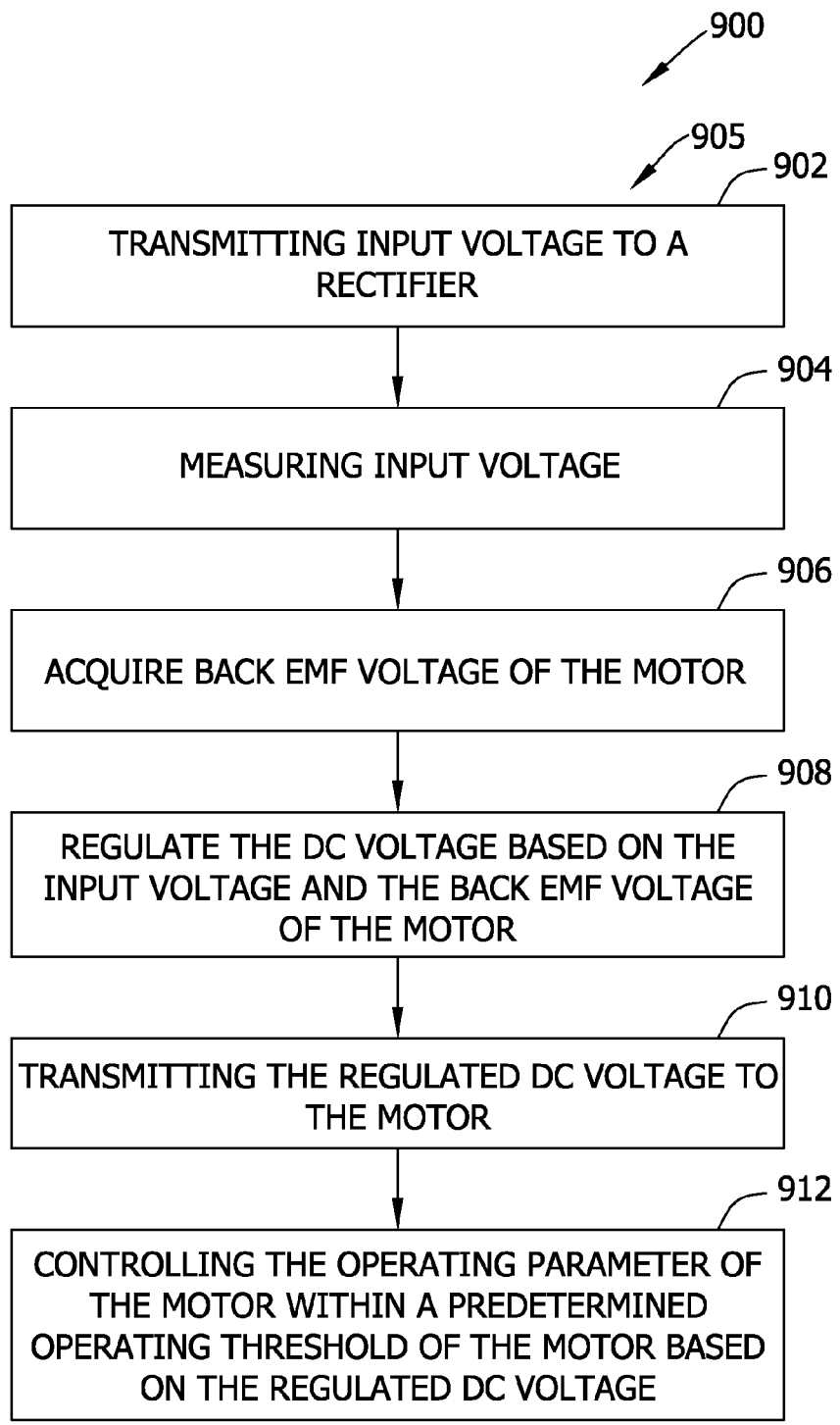

_US 8,896,248 B2_

METHODS AND SYSTEMS FOR CONTROLLING A MOTOR

BACKGROUND OF THE INVENTION

The embodiments described herein relate generally to motors, and more particularly, to methods and systems used to control the operating characteristics of an electrically commutated motor.

Electrically commutated motors (ECMs) are used in a variety of systems operating in a variety of industries. ECMs are used to power products such as fans used in heating, ventilation and air conditioning systems (HVAC). ECMs are subject to many operating conditions and often, the operating conditions necessitate that operating characteristics of the ECM change to match the requirements of the associated application (i.e., different speeds or airflow requirements for HVAC applications). More specifically, control circuits for ECMs must typically be changed to enable the ECM to operate with different operating characteristics for different applications and/or for different voltage levels.

In some known systems, the speed-torque characteristics of motors are an integral part of the design and rating of the system. When the motor within such a system is upgraded to include a brushless direct current (DC) motor or an existing ECM is repaired/retrofitted, the characteristics that depend on the speed-torque curve of the upgraded/repaired motors have to be re-evaluated. The re-evaluation is necessary since the new ECM could have a different speed-torque curve than the previous ECM and consequently, if provided with the same speed-torque curve as the previous ECM, operate at several hundred RPMs faster than the new ECM's capabilities. This operational characteristic of an ECM can result in the ECM having higher speeds under some conditions than it did prior to upgrade or retrofit/repair.

Further, in some known systems, supply or input voltages are limited to the field technician who is upgrading or repairing components such as the ECM or associated circuits. In such cases, it is desirable to have available ECM replacement motor and controls operable at either 240V or 460V. Motor operation over such a two to one range of input voltages could require a regulating device for full load operation over the voltage range. Known voltage regulating systems include a boost regulator to increase voltage or include a buck regulator to drop voltage. These regulating systems include considerable active electronics with passive components, which components increase the cost and complexity of the system while reducing system reliability.

BRIEF DESCRIPTION OF THE INVENTION

In one aspect, a method of controlling an operating parameter of a motor is provided. The method includes transmitting an input voltage to a rectifier and converting the input voltage to a DC voltage. The DC voltage supplied to the motor is regulated by the inverter module 112. The operating parameter is controlled based on the regulated DC voltage.

In another aspect, a method of controlling a speed of a motor is provided. The method includes transmitting an input voltage to a rectifier and converting the input voltage to a DC voltage. The DC voltage supplied to the motor is regulated by the inverter module 112. The speed of the motor is controlled based on the regulated DC voltage In a further aspect, a control system for a motor is provided. The control system includes an inverter coupled to the motor. The control system further includes a microcontroller coupled to the inverter. The microcontroller includes a processor programmed to measure an input voltage and acquire a back EMF voltage of the motor. The processor is also programmed to regulate voltage output by the inverter based at least partially on the input voltage and back EMF voltage to facilitate controlling operation of the motor.

BRIEF DESCRIPTION OF THE DRAWINGS

FIG. 9 is an exemplary flowchart illustrating a method of controlling the motor of FIG. 1.

DETAILED DESCRIPTION OF THE INVENTION

Figure 1:
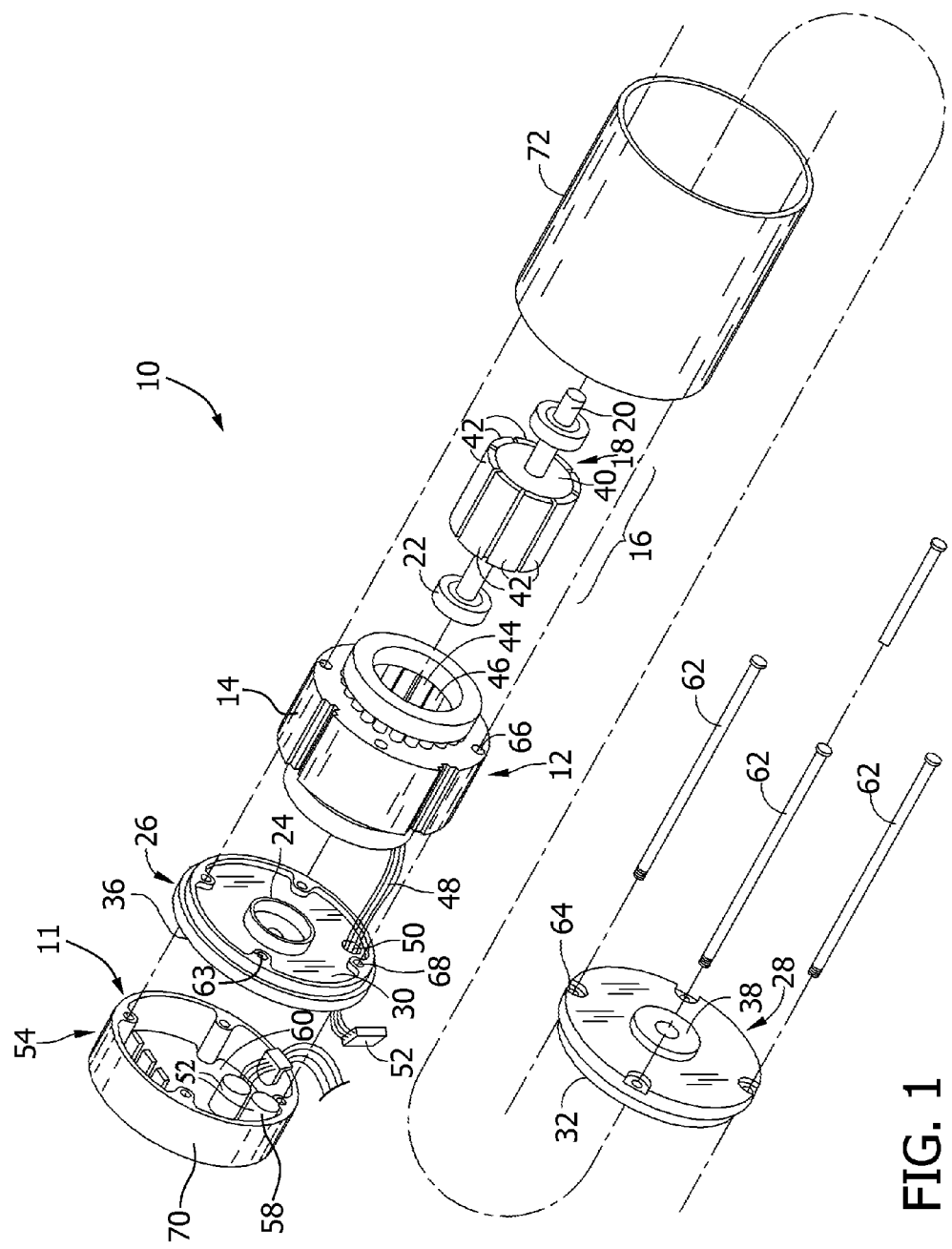
FIG. 1 is an exploded view of an exemplary motor.
Figure 2:
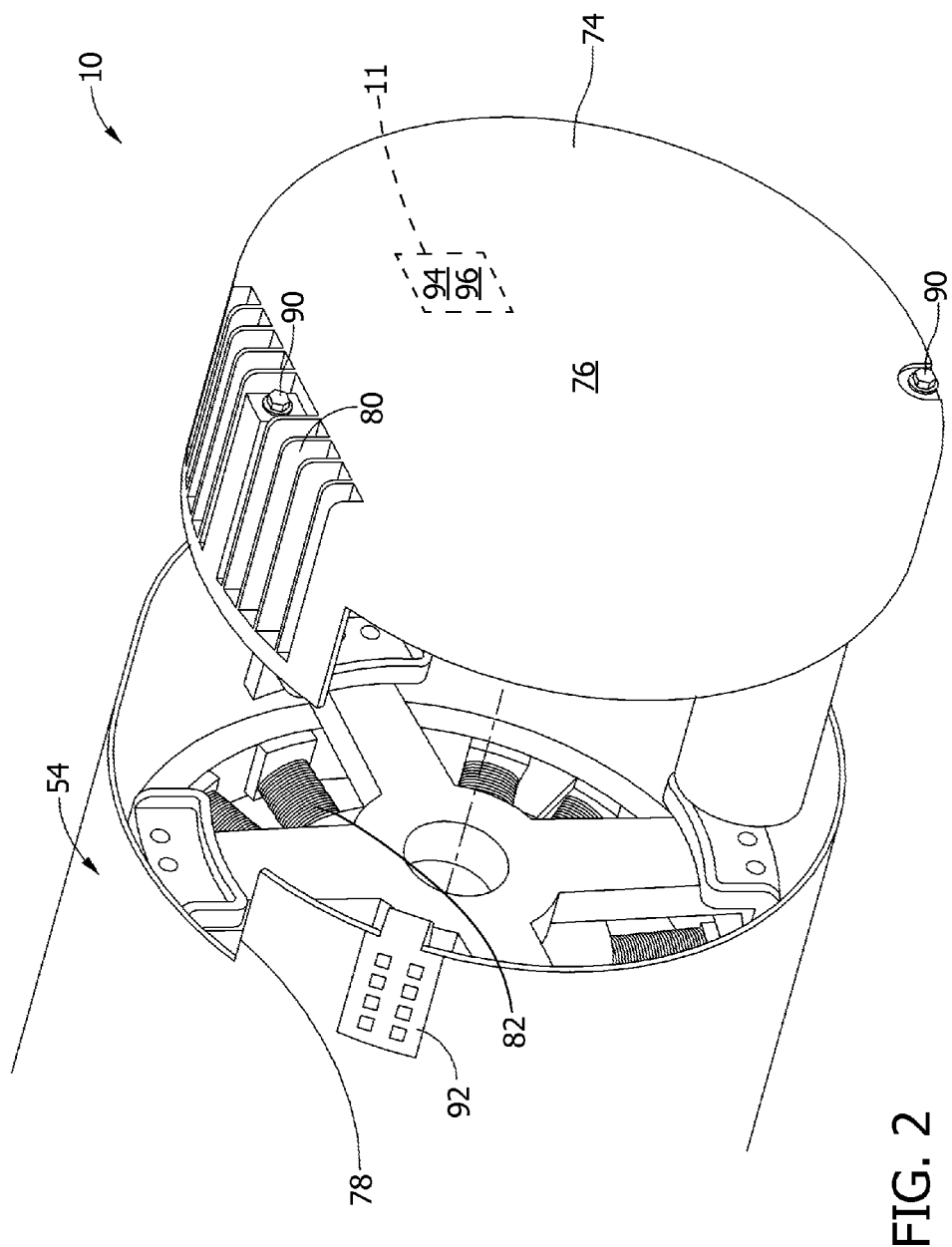
FIG. 2 is an exploded partial view of the motor of FIG. 1 having an exemplary embodiment control system coupled to the motor for use in controlling operation of the motor.

FIG. 1 is an exploded view of an exemplary motor 10. FIG. 2 is an exploded partial view of motor 10 having an exemplary control system 11 coupled to motor 10. Motor 10 includes a stationary assembly 12 including a stator or core 14 and a rotatable assembly 16 including a permanent magnet rotor 18 and a shaft 20. In the exemplary embodiment, motor 10 is used in a heating, ventilating and air conditioning system (not shown).

Rotor 18 is mounted on and keyed to shaft 20 journaled for rotation in conventional bearings 22. Bearings 22 are mounted in bearing supports 24 integral with a first end member 26 and a second end member 28. End members 26 and 28 have inner facing sides 30 and 32 between which stationary assembly 12 and rotatable assembly 16 are located. Each end member 26 and 28 has an outer side 34 and 36 opposite its inner side 30 and 32. Additionally, second end member 28 has an aperture 38 for shaft 20 to extend through outer side 34.

Rotor 18 comprises a ferromagnetic core 40 and is rotatable within stator 14. Segments 42 of permanent magnet material, each providing a relatively constant flux field, are secured, for example, by adhesive bonding to rotor core 40. Segments 42 are magnetized to be polarized radially in relation to rotor core 40 with adjacent segments 42 being alternately polarized as indicated. While magnets on rotor 18 are illustrated for purposes of disclosure, it is contemplated that other rotors having different constructions and other magnets different in both number, construction, and flux fields may be utilized with such other rotors within the scope of the invention.

Stationary assembly 12 comprises a plurality of winding stages 44 adapted to be electrically energized to generate an electromagnetic field. Stages 44 are coils of wire wound around teeth 46 of laminated stator core 14. Winding terminal leads 48 are brought out through an aperture 50 in first end member 26 terminating in a connector 52. While stationary assembly 12 is illustrated for purposes of disclosure, it is contemplated that other stationary assemblies of various other constructions having different shapes and with different number of teeth may be utilized within the scope of the invention.

Motor 10 further includes an enclosure 54 which mounts on the rear portion of motor 10. Control system 11 includes a plurality of electronic components 58 and a connector (not shown) mounted on a component board 60, such as a printed circuit board. Control system 11 is connected to winding stages 44 by interconnecting connector 52. Control system 11 applies a voltage to one or more of winding stages 44 at a time for commutating winding stages 44 in a preselected sequence to rotate rotatable assembly 16 about an axis of rotation.

Connecting elements 62 include a plurality of bolts that pass through bolt holes 64 in second end member 28, bolt holes 66 in core 14, bolt holes 68 in first end member 26, and bolt holes 70 in enclosure 44. Connecting elements 62 are adapted to urge second end member 28 and enclosure 44 toward each other thereby supporting first end member 26, stationary assembly 12, and rotatable assembly 16 therebetween. Additionally, a housing 72 is positioned between first end member 26 and second end member 28 to facilitate enclosing and protecting stationary assembly 12 and rotatable assembly 16.

Motor 10 may include any even number of rotor poles and the number of stator poles are a multiple of the number of rotor poles. For example, the number of stator poles may be based on the number of phases. In one embodiment (not shown), a three-phase motor 10 includes six rotor pole pairs and stator poles.

FIG. 2 is an exploded end view of an embodiment of motor 10. A chassis 74 of enclosure 54 serves as an end shield 76 for motor 10. Motor enclosure 54 also includes a slot 78 which engages a heat sink 80 formed in chassis 74. Motor 10 is configured such that motor enclosure 54 covers control system 11 (schematically shown in FIG. 2). Within motor enclosure 54 are windings 82 of motor 10.

In one embodiment, fasteners 90 pass through end shield 76 to secure control system 11 within motor enclosure 54. This alignment and symmetry remain even when chassis 74 containing the electronics of control system 11 is removed. Retaining the alignment and symmetry within enclosure 54 is important as it lowers a replacement cost of control system 11 in the field. Additionally, such a configuration allows for placement of a power connector 92 flush with enclosure 54.

In the exemplary embodiment, motor 10 includes a brushless DC motor. Alternatively, motor 10 may include other motors such as, but not limited to, brushless AC motors and switched reluctance motors. In one embodiment, motor 10 includes a brushless DC motor having a known classification of a "56 Frame 3 Hp" motor, which is a three-phase motor. Motor 10 includes a voltage rating 94 which is determined by the motor manufacturer and which is stored in control system 11.

Motor 10 further includes a pre-determined operating threshold 96, which is also stored in control system 11, for efficient operation of motor 10. In the exemplary embodiment, pre-determined operating threshold 96 includes a minimum voltage of motor 10 and/or a maximum voltage of motor 10. Attempted operation below the minimum input voltage may not be possible and operation above the maximum input voltage may damage the control of motor 10. Knee point voltage is a maximum voltage at which the output torque has to decrease to be able to increase speed, while limiting the current to be lesser or equal to a constant torque region for efficient operation of motor 10.

Figure 3:
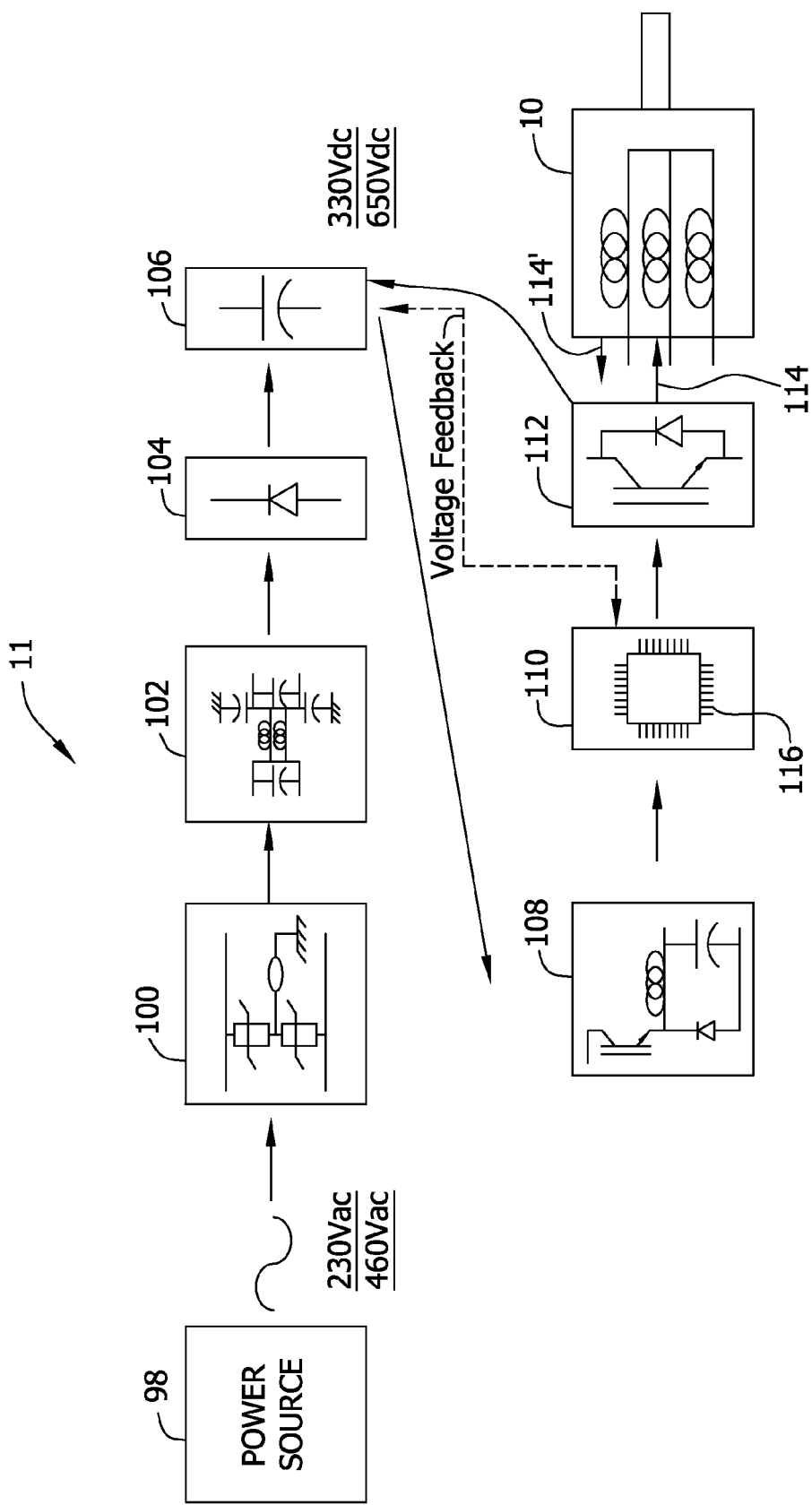
FIG. 3 is a block diagram of the exemplary control system of FIG. 2.

FIG. 3 is a block diagram of exemplary control system 11 for enabling voltage regulation of motor 10 in response to an input voltage 98 that is supplied by a power source (not shown). In the exemplary embodiment, input voltage 98 includes a range of voltage from about 230+/−15% $V_{rms}$ to about 460+/−10 $V_{rms}$. System 11 includes a surge protector 100, a filter 102, a rectifier 104 and a capacitor 106. System further includes a power supplier 108, a microcontroller 110 and an inverter 112. Inverter 112 is coupled to microcontroller 110 and to motor 10. Microcontroller 110 includes a controller such as, but not limited to, a motor controller or a system controller. Any controller may be used that facilitates controlling motor 10.

Surge protector 100 receives input voltage 98 and is configured to protect motor 10 from voltage transients. Filter 102 is configured to remove electromagnetic interference from input voltage 98. After filtering, input voltage 98 is rectified by rectifier 104 enabling conversion of input voltage 98 to a DC voltage 114. In the exemplary embodiment, DC voltage 114 includes a range from about $330V_{dc}$ to about $650V_{dc}$. DC voltage 114 may include other ranges of voltages that facilitate operation of motor 10.

Power supplier 108 is configured to receive DC voltage 114 from capacitor 106. Power supplier 108 reduces DC voltage 114 to a voltage suitable for powering microcontroller 110. Inverter 112 receives DC voltage 114 and regulates DC voltage 114 to motor 10. In particular, under commands of microcontroller 110, inverter 112 is configured to condition DC voltage 114 to regulate power and control operations of motor 10.

Microcontroller 110 includes a processor 116 that is programmed to measure input voltage 98. Processor 116 is also configured to acquire a counter-electromotive force also known as back electromotive force (denoted "back EMF 114'"), which is voltage or electromotive force that resists or pushes against induced current. In an embodiment, processor 116 can measure back EMF 114'. Alternatively, processor 116 can retrieve back EMF 114' from a memory (not shown) of microcontroller 110. Based at least partially on the input voltage 98 and back EMF voltage 114', processor 116 is further programmed to control inverter 112 to regulate DC voltage 114 applied to motor 10. Inverter 112 is configured to regulate DC voltage 114 to facilitate controlling an operating parameter of motor 10 within predetermined operating parameter 96 of motor 10. In the exemplary embodiment, the operating parameter 96 includes speed of rotation and/or torque of motor 10.

Microcontroller 110, in response to the input voltage 98 and back EMF voltage 114', is configured to control inverter 112 to enable controlling the speed and/or torque of motor 10. In the exemplary embodiment, inverter 112 is configured to provide regulated voltage 114 to motor 10 to facilitate controlling the speed and/or torque under predetermined operating threshold 96 such as, but not limited to, the knee-point voltage of motor 10. By maintaining the speed below the maximum knee-point voltage, torque of motor 10 remains substantially constant during operation of motor 10 which enables efficient operation of motor 10. Further, when inverter 112 regulates DC voltage 114, the speed of rotation is controlled enabling efficient operation of motor 10.

For example, motor 10 having back EMF voltage rating 96 of 230V may be coupled to a power source (not shown) that supplies voltage 98 of 230V. Microcontroller 110 is configured to compare input voltage 98 of 230V to back EMF voltage 114' of 230V. Based at least partially on the comparison, microcontroller 110 controls inverter 112 to regulate DC voltage 114 supplied to motor 10 to facilitate controlling the speed of motor 10 which enables substantially constant torque operation of motor 10 while operating motor 10 below the knee-point voltage of motor 10.

Figure 4:
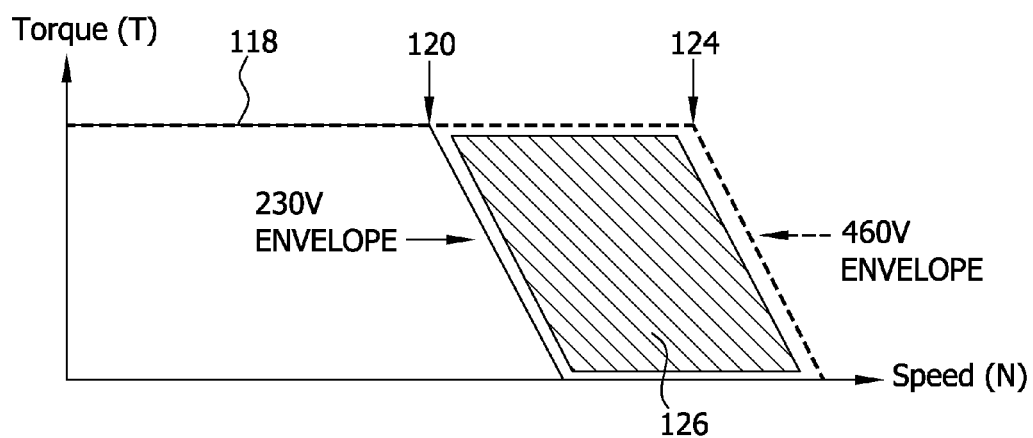
FIG. 4 is an exemplary speed-torque curve of the motor at a plurality of input voltages.
Figure 5:
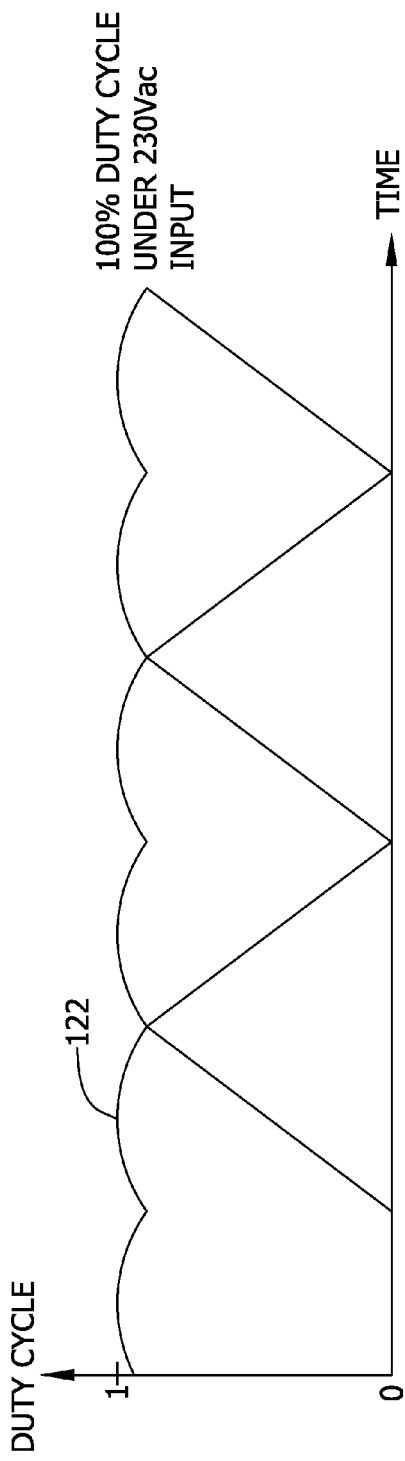
FIG. 5 is an exemplary duty cycle curve of the motor operating at an input voltage.

FIG. 4 is a speed-torque curve 118 for a motor, for example, motor 10. Curve 118 shows substantially constant torque operation of motor 10 when speed of motor 10 is maintained below a speed associated with knee-point voltage 120 relating input voltage 98 of 230V and back EMF voltage 114' of 230V. Voltage regulation by inverter 112 enables efficient operation of motor 10. FIG. 5 is an exemplary duty cycle curve 122 over time of input voltage 98 of $230V_{ac}$ and 230V back EMF voltage 114' for motor 10.

In another example, motor 10 having back EMF voltage 114' of 230V may be coupled to power source (not shown) that supplies input voltage 98 of 460V. Microcontroller 110 is configured to compare input voltage 98 of 460V and back EMF voltage 114' of 230V. Based at least partially on the comparison, microcontroller 110 controls inverter 112 to regulate DC voltage 114 supplied to motor 10 to facilitate controlling the speed of motor 10. Maintaining the speed enables substantially constant torque operation of motor 10 while operating motor 10 under knee-point voltage of motor 10.

Since input voltage 98 has a value of 460V and back EMF voltage 114' is 230V, inverter 112 is configured to regulate DC voltage 114 to motor 10 to facilitate reducing the speed of rotation of motor 10. A known motor (not shown) having a 230V voltage rating when supplied with 460V power will rotate at approximately twice the operating speed since speed is proportional to voltage. Such operation may cause motor to operate beyond a desired maximum speed threshold and cause inefficient operation. For example, for a given motor application for a device such as fan, if the input voltage fluctuates from 230V to 460V, known controllers translate the input voltage without limiting the operating range of the device. Under known motors, the device operates at elevated power and speed leading to problems and/or failures of the device.

In the exemplary embodiment, control system 11 enables controlling the speed of motor 10 having a 230V rating based on input voltage 98 of 460V so that motor 10 operates under predetermined operating parameters 96 such as, but not limited to, knee-point voltage of motor 10. In particular, inverter 112 regulates the DC voltage 114 applied to motor 10 to reduce the speed of rotation of motor 10 to facilitate operation of motor 10 under predetermined operating threshold 96. In one embodiment, inverter 112 regulates DC voltage 114 to reduce the speed of motor 10 to about 50% to enable efficient operation of motor 10 having back EMF voltage of about 230V.

Figure 6:
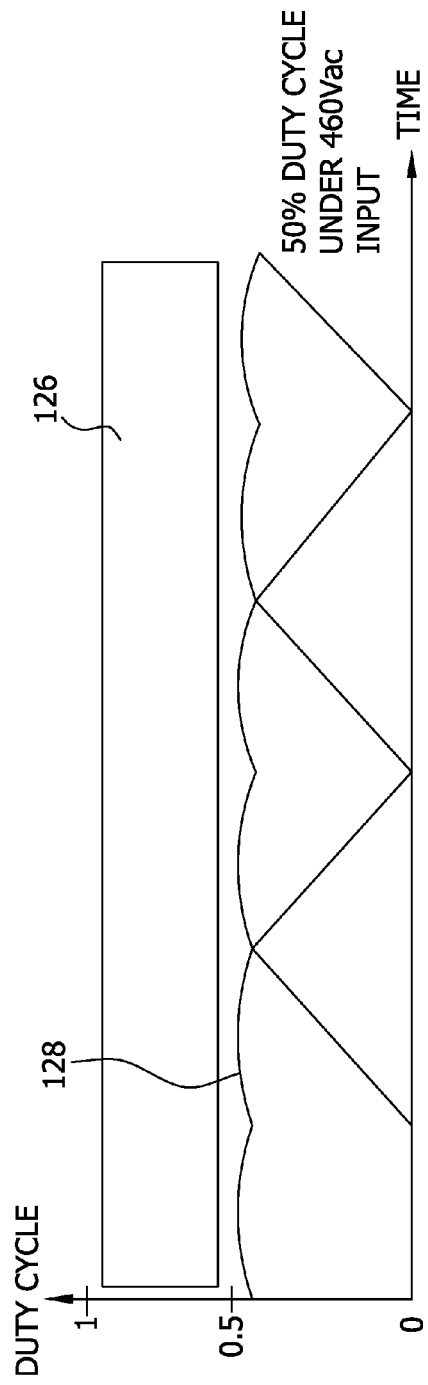
FIG. 6 is another exemplary duty cycle of the motor operating at another input voltage that is different from the input voltage of FIG. 5.

Curve 118 in FIG. 4 shows constant torque within knee-point voltage for 460V input voltage 98 and voltage rating 94 of 230V for motor 10. FIG. 4 further illustrates a cut-off region 126 between knee-point voltage 124 for 460V and knee-point voltage 124 for 230V. Cut-off region 126 represents reduction of speed of motor 10 as regulated by inverter 112. In the exemplary embodiment, cut-off region 118 represents about 50% reduction in speed. FIG. 6 is a duty cycle-time curve 128 for motor 10. Curve 128 shows an exemplary duty cycle over time for input voltage 98 of 460V and back EMF voltage 114' of 230V for motor 10. FIG. 6 illustrates cut-off region 118 representing reduced speed motor 10. In the exemplary embodiment, duty cycle is reduced by about 50% to enable efficient operation of motor 10.

Figure 7:
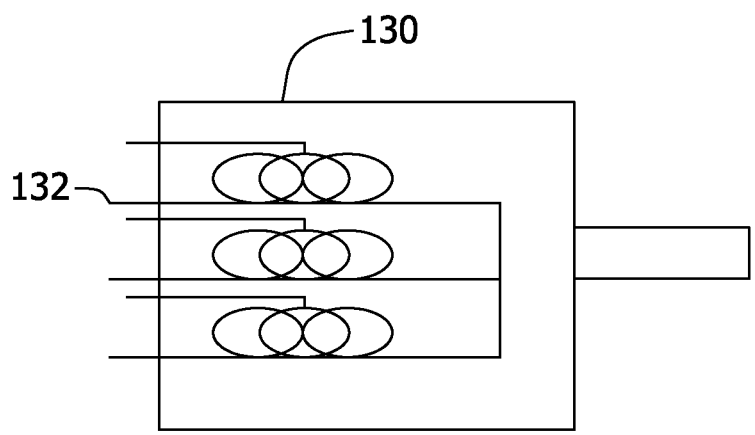
FIG. 7 is a block diagram of another exemplary motor having a tapped winding for use with the exemplary control system of FIG. 3.

Control system 11 includes winding connection such as, but not limited to, connector 52 (shown in FIG. 1) and power connector 92 (shown in FIG. 2) to facilitate matching back EMF 114' to input voltage 98 for efficient operation of motor 10 at $460V_{rms}$ input. In one embodiment, power connector 92 includes a plug accessible to a field installer to facilitate appropriate connection at installation. FIG. 7 is a block diagram of another exemplary motor 130 having a tapped winding 132 for use with the exemplary control system of FIG. 3 to facilitate matching motor back EMF voltage 114' to input voltage 98. Tapped winding 132 for each phase are oriented at approximately ½ turns within motor 130 to facilitate matching back EMF voltage 114' operating at $240_{rms}$ or $460V_{rms}$. At $240V_{rms}$ operation, tapped winding 132 is used for operation of motor 130 while at $460_{rms}$ a full winding is connected with a voltage source (not shown). The current requirement for full horsepower at 240 $V_{rms}$ and tapped winding 132 is about twice the current requirement for motor operation at $460V_{rms}$ at substantially the same horsepower. In an embodiment, to facilitate compensating for disparity in current requirements for 240 $V_{rms}$ and $460V_{rms}$ operation, a bottom half (not shown) of tapped winding 132 includes a heaver gage wire (note shown) than a top half (not shown) of tapped winding 132.

Figure 8:
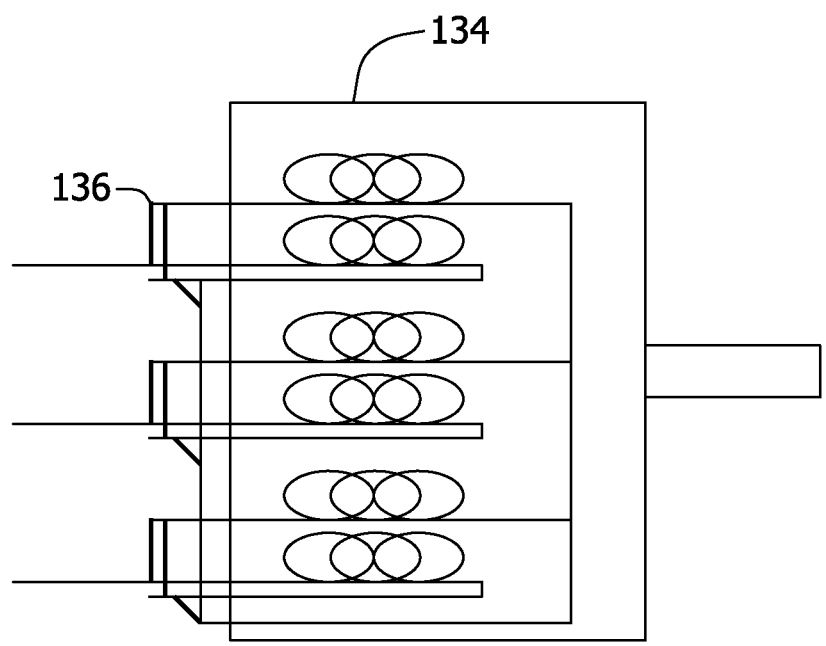
FIG. 8 is a block diagram of another exemplary motor having a series/parallel winding for use with the exemplary control system of FIG. 3.

FIG. 8 is a block diagram of another exemplary motor 134 having a series/parallel winding 136 for use with the exemplary control system of FIG. 3 to facilitate matching motor back EMF voltage 114' to input voltage 98. The series/parallel winding 136 facilitates utilization of stator lamination winding slots (not shown). In series/parallel winding 136, substantially all coils are the same gage wire and when connected are fully utilized for either the $240V_{rms}$ operation or the $460V_{rms}$ operation.

For tapped winding 132 or series/parallel winding 136, micro controller 110 determines motor back EMF voltage 114' and controls rotation of motor 130/134 at a predetermined speed and measuring the torque effect. For controller 110 configured for direct measurement of back EMF through a divider network attached to the output to the phases, the measurement is direct. In sine wave controls designed to measure the current produced by a known phase voltage, the measurement requires inference based on an industry known 4 to 1 increase in inductance and the doubling of back EMF voltage 114' produced at the full winding in tapped winding 132 or the series connection for series/parallel winding 136. If a mismatched line voltage winding connection is made in the field by a worker (not shown), damage will occur only in the case of misconnected parallel connection that uses only half of the intended parallel windings.

FIG. 9 is an exemplary flowchart 900 illustrating a method 905 of controlling an operating parameter of a motor, for example, motor 10 (shown in FIG. 1), during an operating cycle. Method 905 includes receiving an input voltage, for example input voltage 98 (shown in FIG. 3) from a power source (not shown) and transmitting 902 input voltage to a rectifier, for example rectifier 104 (shown in FIG. 3). In the exemplary embodiment, input voltage includes a range from about 230±15% $V_{rms}$ to about 460±10% $V_{rms}$. Microcontroller, for example microcontroller 110 (shown in FIG. 3) measures 904 input voltage and measures 906 back EMF voltage 114' (shown in FIG. 3) of motor 10. Rectifier 104 converts input voltage into a DC voltage. Microcontroller 110 controls an inverter, for example inverter 112, to facilitate regulating 908 DC voltage based at least partially on the input voltage and back EMF voltage. Inverter 112 transmits 910 regulated DC voltage to motor to control 912 operation of motor 10.

The embodiments described herein provide for substantially full load operation over a wide input voltage range. The embodiments described herein provide a motor having a back EMF voltage that is appropriately matched to the input voltage at loads such as full loads while minimizing or eliminating active electronics with passive components to reduce cost, complexity and inefficiencies. The embodiments provide an inverter coupled to a controller to regulate voltage to a motor over a range of input voltages such as, but not limited to, voltage range from about 230±15% $V_{rms}$ to about 460+10% $V_{rms}$. The embodiments further include a winding connection to match back EMF voltage to input voltage. The winding connection includes a connector such as a plug accessible to a field installer. Additionally, the embodiments provide that voltage is allowed to vary in harmony with the input voltage minimizing or eliminating establishment of a common rail voltage for either $230V_{rms}$ or $460V_{rms}$ 3-phase input.

The embodiments described herein provide a control system for motor. The disclosed voltage ranges and knee-point voltages include all sub ranges therebetween. The control system can be used for new manufacture of motors or for integration with existing motors. In one embodiment, the control system includes a microcontroller coupled to an inverter of the motor. The microcontroller and inverter facilitate regulating voltage applied to the motor to control the motor over a range of known and unknown voltages. The microcontroller and inverter facilitate operation of the motor within threshold parameters for efficient operation of the motor. Additionally, the control system allows a field technician to repair or upgrade motor without knowing the input voltage from the power source.

A technical effect of the system described herein is that the microcontroller and inverter facilitate voltage regulation applied to the motor to control the motor over a range of known and unknown voltages. Another technical effect of the system is that the microcontroller and inverter facilitate operation of the motor within threshold parameters for efficient operation of the motor.

Exemplary embodiments of the control system and methods of controlling motor are described above in detail. The control system and methods are not limited to the specific embodiments described herein, but rather, components of the control system and/or the motor and/or steps of the method may be utilized independently and separately from other components and/or steps described herein. For example, the control system and methods may also be used in combination with other power systems and methods, and are not limited to practice with only the HVAC system as described herein. Rather, the exemplary embodiments can be implemented and utilized in connection with many other system applications or other support.

In operation, the system is configured according to the user's requirements. The system may be configured as any of the following non-exclusive circuits alone or in combination, for example, a power supply regulating circuit, an electromagnetic interference filter, a speed modulator, a torque modulator, a transient suppression circuit, an active power factor correction circuit, a passive power factor correction circuit and a process parameter control circuit.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any layers or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of controlling an operating parameter of a motor, the method comprising:
   transmitting an input voltage to a rectifier, wherein an amount of the transmitted input voltage is unknown and is within a predetermined range of input voltages;
   converting the input voltage to a DC voltage;
   measuring the input voltage by a microcontroller;
   acquiring a back EMF voltage of the motor;
   regulating the DC voltage based at least partially on input voltage and the back EMF voltage of the motor to control the motor for any amount of transmitted input voltage within the predetermined range of input voltages;
   transmitting the regulated DC voltage to the motor; and
   controlling the operating parameter of the motor based on the regulated DC voltage.

2. The method of claim 1, wherein transmitting the input voltage comprises transmitting the input voltage in a range from about $230\pm15V_{rms}$ to about $460\pm10V_{rms}$.

3. The method of claim 1, wherein controlling the operating parameter comprises controlling a speed of the motor.

4. The method of claim 3, wherein controlling the operating parameter comprises controlling the speed of the motor below a knee-point voltage of the motor.

5. The method of claim 4, wherein controlling the operating parameter below the knee-point voltage of the motor comprises maintaining a substantially constant torque.

6. The method of claim 1, wherein controlling the operating parameter comprises controlling a torque of the motor.

7. The method of claim 2, wherein the input voltage comprises about $460V_{rms}$.

8. The method of claim 7, wherein controlling the operating parameter comprises controlling a speed of the motor.

9. The method of claim 3, wherein controlling the speed comprises reducing the speed of the motor.

10. The method of claim 3, further comprising controlling a torque of the motor.

11. A method of controlling a speed of a motor, the method comprising:
    transmitting an input voltage to a rectifier, wherein an amount of the transmitted input voltage is unknown and is within a predetermined range of input voltages;
    converting the input voltage to a DC voltage;
    measuring the input voltage by a microcontroller;
    acquiring a back EMF voltage of the motor;
    regulating the DC voltage based at least partially on the input voltage and the back EMF voltage of the motor to control the motor for any amount of transmitted input voltage within the predetermined range of input voltages;
    transmitting the regulated DC voltage to the motor; and
    controlling the speed of the motor based on the regulated DC voltage.

12. The method of claim 11, wherein controlling the speed of the motor comprises controlling the speed of the motor below a pre-determined knee-point voltage.

13. The method of claim 12, wherein controlling the speed below the pre-determined knee-point voltage comprises maintaining a substantially constant torque.

14. The method of claim 11, wherein the input voltage comprises about 460 volts.

15. The method of claim 14, wherein controlling the speed of the motor comprises reducing the speed of the motor.

16. A control system for controlling a motor, comprising:
an inverter configured for coupling with the motor to receive an input voltage from a power source and to provide a regulated output voltage to the motor; and
a microcontroller coupled to said inverter, said microcontroller comprising a processor programmed to:
measure the input voltage, wherein an amount of the input voltage is unknown and is within a predetermined range of input voltages;
acquire a back EMF voltage of the motor; and
regulate the voltage output by said inverter voltage based at least partially on the measurements of the input voltage and the back EMF voltage to facilitate controlling operation of the motor for any amount of input voltage within the predetermined range of input voltages.

17. The control system of claim 16, wherein the input voltage comprises a range from about $230 \pm 15\% V_{rms}$ to about $460 \pm 10\% V_{rms}$.

18. The control system of claim 17, wherein the input voltage is about $460 V_{rms}$.

19. The controls system of claim 18, wherein said inverter facilitates controlling a speed of the motor.

20. The control system of claim 16, wherein the motor is a three-phase motor.

* * * * *